(12) United States Patent
Gilliland et al.

(10) Patent No.: US 11,148,798 B2
(45) Date of Patent: Oct. 19, 2021

(54) ENGINE AND ROTATABLE PROPROTOR CONFIGURATIONS FOR A TILTROTOR AIRCRAFT

(71) Applicant: Textron Innovations Inc., Providence, RI (US)

(72) Inventors: Colton Gilliland, Northlake, TX (US); Jeffrey Williams, Hudson Oaks, TX (US); Michael E. Rinehart, Euless, TX (US); James Kooiman, Fort Worth, TX (US); Mark Przybyla, Keller, TX (US); Clegg Smith, Fort Worth, TX (US); Eric Stephen Olson, Fort Worth, TX (US); George Ryan Decker, Mansfield, TX (US); David Russell Bockmiller, Fort Worth, TX (US)

(73) Assignee: Textron Innovations Inc.

( * ) Notice: Subject to any disclaimer, the term of this patent is extended or adjusted under 35 U.S.C. 154(b) by 464 days.

(21) Appl. No.: 16/015,760

(22) Filed: Jun. 22, 2018

(65) Prior Publication Data
US 2019/0389572 A1 Dec. 26, 2019

(51) Int. Cl.
*B64C 29/00* (2006.01)
*B64D 35/00* (2006.01)
*B64C 3/56* (2006.01)

(52) U.S. Cl.
CPC ............ *B64C 29/0033* (2013.01); *B64C 3/56* (2013.01); *B64D 35/00* (2013.01)

(58) Field of Classification Search
CPC . B64C 29/0033; B64C 3/56; B64C 2201/108; B64C 2201/165; B64C 2201/104; B64C 27/26; B64C 27/08; B64D 35/00; B64D 35/04; B64D 27/02; F16C 2326/43
See application file for complete search history.

(56) References Cited

U.S. PATENT DOCUMENTS

| | | | | | |
|---|---|---|---|---|---|
| 2,814,451 | A | * | 11/1957 | Turner | B64C 29/0033 244/7 R |
| 2,936,967 | A | * | 5/1960 | Dancik | B64C 29/0033 244/7 C |
| 2,936,968 | A | * | 5/1960 | Mazzitelli | B64C 29/0033 244/7 C |
| 3,065,929 | A | * | 11/1962 | Holland, Jr. | B64C 29/0033 244/12.4 |
| 3,106,369 | A | * | 10/1963 | Borst | B64C 11/40 244/7 R |
| 3,259,343 | A | * | 7/1966 | Roppel | B64C 29/0091 244/53 R |

(Continued)

OTHER PUBLICATIONS

United States Patent and Trademark Office, U.S. Appl. No. 13/966,678, filed Aug. 14, 2013, 31 pages.

*Primary Examiner* — Medhat Badawi
(74) *Attorney, Agent, or Firm* — Whitaker Chalk Swindle & Schwartz PLLC; Enrique Sanchez

(57) ABSTRACT

A tiltrotor aircraft includes a propulsion system with a fixed engine and a rotatable proprotor. The engine is located on the top surface of the wing of the tiltrotor aircraft, and the rotatable proprotor assembly is also mounted on the top surface of the wing. The engine and proprotor assembly are connected via a series of one or more gearboxes that route the engine output from the engine to the proprotor.

15 Claims, 7 Drawing Sheets

(56) References Cited

U.S. PATENT DOCUMENTS

| | | | | |
|---|---|---|---|---|
| 3,284,027 | A * | 11/1966 | Mesniere | B64C 29/0033 244/12.4 |
| 3,360,217 | A * | 12/1967 | Trotter | B64C 29/0033 244/12.4 |
| 3,666,209 | A * | 5/1972 | Taylor | B64C 29/0033 244/7 C |
| 3,703,832 | A * | 11/1972 | Lindsey | G01C 19/28 74/5.45 |
| 3,797,783 | A * | 3/1974 | Kisovec | B64C 29/0033 244/7 A |
| 4,136,845 | A * | 1/1979 | Eickmann | B64C 11/28 244/12.4 |
| 4,142,697 | A * | 3/1979 | Fradenburgh | B64C 11/003 244/7 R |
| 4,436,261 | A * | 3/1984 | Koleff | B64C 29/0033 244/1 R |
| 4,496,120 | A * | 1/1985 | Eickmann | B64C 11/28 244/105 |
| 4,682,512 | A * | 7/1987 | Peterson | B64C 27/12 416/170 R |
| 4,691,878 | A * | 9/1987 | Vaughan | B64C 3/56 244/49 |
| 4,783,023 | A * | 11/1988 | Jupe | B64C 27/12 244/17.19 |
| 4,979,698 | A * | 12/1990 | Lederman | B64C 29/0033 244/17.13 |
| 5,054,716 | A * | 10/1991 | Wilson | B64C 29/0033 244/56 |
| 5,085,315 | A * | 2/1992 | Sambell | B64C 27/30 244/17.25 |
| 5,096,140 | A * | 3/1992 | Dornier, Jr. | B64C 29/0033 244/12.4 |
| 5,645,250 | A * | 7/1997 | Gevers | B64C 35/008 244/101 |
| 5,749,540 | A * | 5/1998 | Arlton | B64C 27/82 244/17.13 |
| 6,030,177 | A * | 2/2000 | Hager | B64C 27/72 244/17.23 |
| 6,260,793 | B1 * | 7/2001 | Balayn | B64C 7/00 244/130 |
| 6,276,633 | B1 * | 8/2001 | Balayn | B64C 27/12 244/56 |
| 6,367,736 | B1 * | 4/2002 | Pancotti | B64C 29/0033 244/48 |
| 6,607,161 | B1 * | 8/2003 | Krysinski | B64C 9/00 244/7 A |
| 6,843,447 | B2 * | 1/2005 | Morgan | B64C 29/0025 244/12.3 |
| 7,520,041 | B1 * | 4/2009 | Aguilar | B25B 27/023 29/255 |
| 7,866,598 | B2 * | 1/2011 | Waide | B64C 29/0033 192/48.5 |
| 7,871,033 | B2 * | 1/2011 | Karem | B64C 27/08 244/17.23 |
| 7,874,513 | B1 * | 1/2011 | Smith | B64C 11/001 244/12.4 |
| 8,152,096 | B2 * | 4/2012 | Smith | B64C 29/0033 244/12.4 |
| 8,292,216 | B1 * | 10/2012 | Rumberger, Jr. | B64C 3/56 244/39 |
| 8,733,690 | B2 * | 5/2014 | Bevirt | B64C 29/0033 244/12.4 |
| 9,126,678 | B2 * | 9/2015 | Ross | B64C 29/0075 |
| 9,174,731 | B2 * | 11/2015 | Ross | B64C 29/0033 |
| 9,475,585 | B2 * | 10/2016 | Hong | B64D 35/00 |
| 9,663,225 | B1 * | 5/2017 | Kooiman | B64C 29/0033 |
| 9,783,292 | B2 * | 10/2017 | Kooiman | B64C 29/0033 |
| 9,809,318 | B1 * | 11/2017 | Williams | B64D 27/26 |
| 9,856,029 | B2 * | 1/2018 | King | B64D 27/26 |
| 9,868,541 | B2 * | 1/2018 | Kooiman | B64D 27/26 |
| 9,868,542 | B2 * | 1/2018 | Williams | B64D 27/26 |
| 9,889,927 | B2 * | 2/2018 | Modrzejewski | B64C 11/50 |
| 9,981,734 | B2 * | 5/2018 | Ivans | B64C 3/26 |
| 10,011,349 | B2 * | 7/2018 | Ivans | B64C 7/02 |
| 10,279,901 | B2 * | 5/2019 | Ivans | B64C 29/0033 |
| 10,399,285 | B2 * | 9/2019 | Carlson | B64F 5/10 |
| 10,633,092 | B2 * | 4/2020 | Willford | B64C 29/02 |
| 10,654,580 | B2 * | 5/2020 | Ross | B64D 35/02 |
| 10,689,106 | B2 * | 6/2020 | Chavez | B64C 27/26 |
| 10,875,627 | B2 * | 12/2020 | Kurikesu | B64C 7/02 |
| 2004/0038768 | A1 * | 2/2004 | Thomassey | B64C 27/12 475/221 |
| 2005/0045762 | A1 * | 3/2005 | Pham | B64C 27/28 244/7 R |
| 2005/0127238 | A1 * | 6/2005 | Ballew | B64C 27/10 244/10 |
| 2007/0102573 | A1 * | 5/2007 | Goto | B64D 15/00 244/76 R |
| 2007/0158494 | A1 * | 7/2007 | Burrage | B64C 39/04 244/7 R |
| 2007/0205325 | A1 * | 9/2007 | Waide | F16D 3/065 244/60 |
| 2007/0241228 | A1 * | 10/2007 | Haynes | B64C 29/0033 244/7 A |
| 2009/0227415 | A1 * | 9/2009 | Buelna | B64D 35/00 475/346 |
| 2009/0266941 | A1 * | 10/2009 | Karem | B64C 3/185 244/7 A |
| 2010/0276549 | A1 * | 11/2010 | Karem | B64C 29/0033 244/7 A |
| 2010/0327123 | A1 * | 12/2010 | Smith | B64C 27/28 244/7 C |
| 2011/0315827 | A1 * | 12/2011 | Collins | B64C 29/0033 244/7 A |
| 2012/0199699 | A1 * | 8/2012 | Isaac | B64C 29/0033 244/7 R |
| 2013/0078100 | A1 * | 3/2013 | Baskin | B64C 27/37 416/204 R |
| 2014/0034781 | A1 * | 2/2014 | Kouros | B64D 27/24 244/60 |
| 2014/0061392 | A1 * | 3/2014 | Karem | B64C 3/16 244/7 R |
| 2014/0263854 | A1 * | 9/2014 | Ross | B64C 29/0033 244/7 A |
| 2015/0048213 | A1 * | 2/2015 | Ross | B64C 29/0033 244/7 A |
| 2015/0048214 | A1 * | 2/2015 | Bockmiller | B64F 5/40 244/7 A |
| 2015/0360774 | A1 * | 12/2015 | Covington | B64C 29/0033 244/7 R |
| 2016/0122039 | A1 * | 5/2016 | Ehinger | B64D 35/00 416/170 R |
| 2016/0229531 | A1 * | 8/2016 | Robertson | B64C 39/04 |
| 2017/0137122 | A1 * | 5/2017 | Kooiman | F16H 1/006 |
| 2017/0158323 | A1 * | 6/2017 | Ross | B64D 27/12 |
| 2017/0217598 | A1 * | 8/2017 | Bacon | B64C 29/0033 |
| 2017/0259521 | A1 * | 9/2017 | Kooiman | B29D 24/005 |
| 2017/0259904 | A1 * | 9/2017 | Kooiman | B64C 3/187 |
| 2017/0259905 | A1 * | 9/2017 | Kooiman | B29D 24/005 |
| 2018/0079485 | A1 * | 3/2018 | Kooiman | B64C 3/56 |
| 2018/0079486 | A1 * | 3/2018 | Kooiman | B64C 1/30 |
| 2018/0079499 | A1 * | 3/2018 | Foskey | B64C 3/56 |
| 2018/0251227 | A1 * | 9/2018 | Ross | B64D 29/06 |
| 2018/0312251 | A1 * | 11/2018 | Petrov | B64C 27/26 |
| 2018/0370624 | A1 * | 12/2018 | Seale | B64C 27/16 |
| 2019/0248483 | A1 * | 8/2019 | Przybyla | B64C 11/28 |
| 2019/0256190 | A1 * | 8/2019 | Olson | B64C 3/56 |
| 2019/0257425 | A1 * | 8/2019 | Gilliland | F16J 15/04 |
| 2019/0277392 | A1 * | 9/2019 | Gilliland | B64C 29/0033 |
| 2019/0323563 | A1 * | 10/2019 | Gilliland | F16C 1/02 |
| 2019/0337629 | A1 * | 11/2019 | Gilliland | B64D 27/10 |
| 2019/0338810 | A1 * | 11/2019 | Gilliland | B64C 29/0033 |
| 2019/0344877 | A1 * | 11/2019 | Gilliland | B64C 29/0033 |
| 2019/0389571 | A1 * | 12/2019 | Gilliland | B64D 35/08 |

* cited by examiner

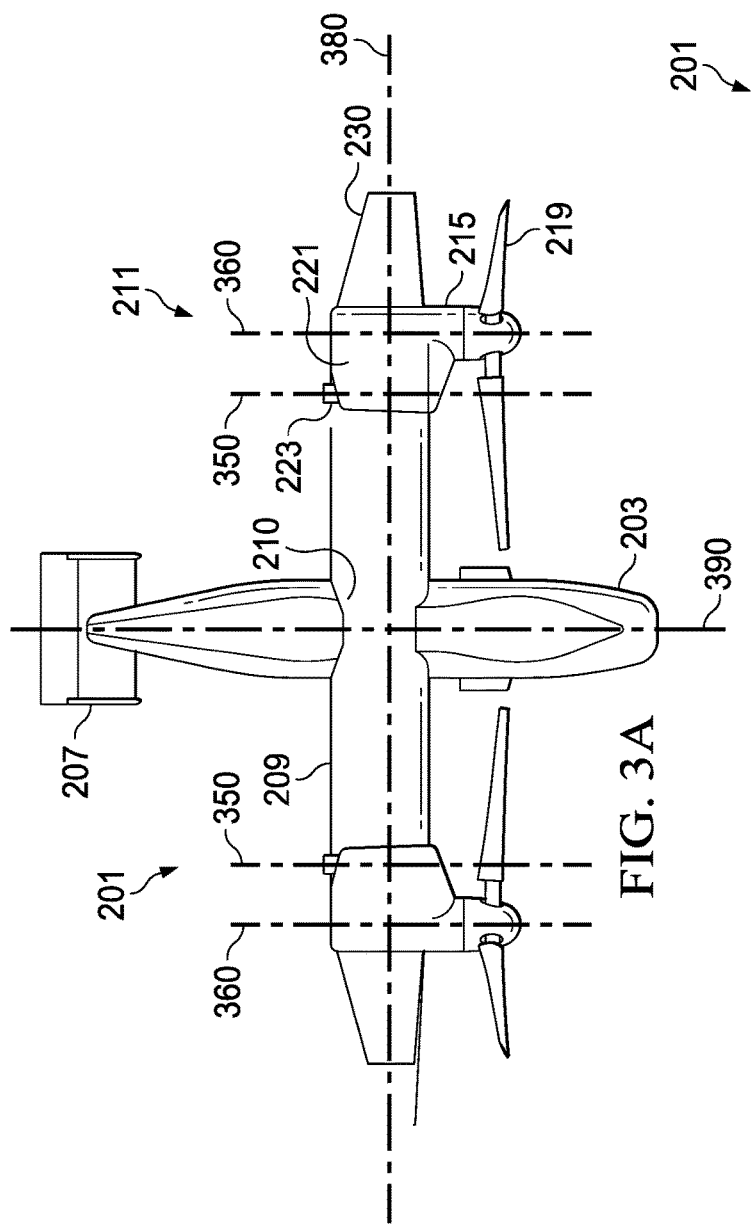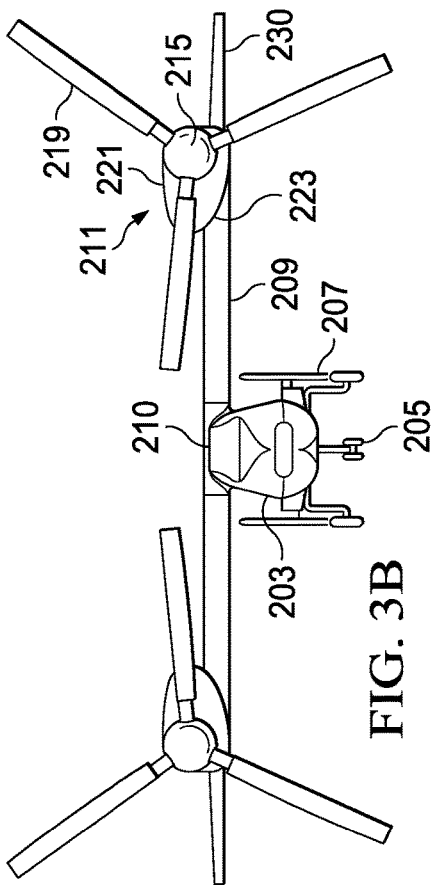

ENGINE AND ROTATABLE PROPROTOR CONFIGURATIONS FOR A TILTROTOR AIRCRAFT

BACKGROUND OF THE INVENTION

1. Field of the Invention

This invention relates to engine and proprotor configurations for tiltrotor aircraft.

2. Background of the Invention

The present invention relates to wing-mounted engines for aircraft. In a typical configuration, to maximize efficiency, the engine and proprotor are configured linearly, whereby the engine has a straight shaft that drives the rotor or propeller. More recently, some aircraft have been developed, such as the V-22 Osprey by Bell Helicopter Textron Inc., that features an engine and proprotor that may be rotated 90° so that the aircraft is capable of vertical take-off and landing (VTOL).

While the V-22 is an extremely successful design for a multi-use aircraft, the mechanical requirements of the engine, proprotor, and wing make storage and maintenance of the aircraft difficult. One improvement to the V-22 design includes a fixed engine with a rotating proprotor as shown in U.S. patent application Ser. No. 13/966,678. In the '678 Application, the engine is fixed at the end of the wing, outboard of die proprotor. While an improvement to locate the engine and proprotor at the end of the wing distal from the fuselage, this configuration limits the ability to incorporate wing extensions outboard of the engine. Additionally, the engine of the '678 Application is located on the wing axis, which, limits the amount of lift that may be generated from the wing, because the length of the wing and therefore the lift surfaces of the wing are reduced by the width of the engine. Another drawback of the '678 Design is that the inboard location of the proprotor limits the diameter of the propeller, and the outboard location of the engine limits the ability to break down the wing for storage.

Based on the foregoing, there is a need for an alternative configuration of a tiltrotor aircraft proprotor and engine that maximizes the surface area of the aircraft wing, and allows flexibility for engine and proprotor placement to minimize the space needed for storage and/or shipment of the tiltrotor aircraft.

SUMMARY OF THE INVENTION

In accordance with the present invention, the engine is therefore fixed above the top surface of the wing, and the pylon and proprotor assembly are also located above the wing, preferably outboard of the engine. This configuration provides added flexibility for storage while maximizing the lift generated by allowing a greater bottom surface of the wing for lift. Additionally, the configuration shown takes the engine out of the wing central axis, thereby reducing the stress on the wing structure. By mounting the proprotor pylon and engine above the wing, wing extensions may be added on the outboard side of the propulsion system, thereby further increasing the lift and reducing fuel consumption to allow for longer flight duration. The wing extensions may be removable or foldable to aid in storage and/or transportation of the tiltrotor aircraft.

To facilitate the separate placement of the fixed engine and rotatable proprotor, one or more gearboxes may be placed in the drive line from the engine output shaft to the proprotor input. In this manner, the direction of the drive shafts may be altered to facilitate flexibility in the placement of the engine and proprotor. Additionally, an interconnect drive system may be included, such that an interconnect drive shaft connects the engine on one side of the aircraft to the proprotor on the other side of the aircraft in the event of a loss of power by one engine. This interconnect drive system may include a gearbox that facilitates the change in direction of the engine output drive to accommodate the separation of the engine and proprotor in various configurations.

BRIEF DESCRIPTION OF THE DRAWINGS

The novelty of the features described herein are set forth in the claims. Additionally, the systems and methods claimed are supported by the drawings of certain embodiments, which are referenced in the detailed description, and are shown as follows.

FIGS. 3A-3D show various views of a tiltrotor aircraft in accordance with the present invention;

DETAILED DESCRIPTION OF THE INVENTION

The disclosure below includes several illustrative embodiments of the system of the present invention. In the interest of clarity, all of the features of the systems are not described in detail, but would be apparent to one of ordinary skill in the art as being a requirement to build a fully functioning design implementing the novel inventions disclosed. Numerous implementation-specific decisions would necessarily be made during the design and construction of an aircraft that meets the goals of the builder. I should be apparent that while any development effort might be complex and time-consuming, it would be routine for one or more of ordinary skill in the art.

The specific special relationships of various components are not described in detail, as those represent design variations well-within the level of skill in the art.

Figure 1:
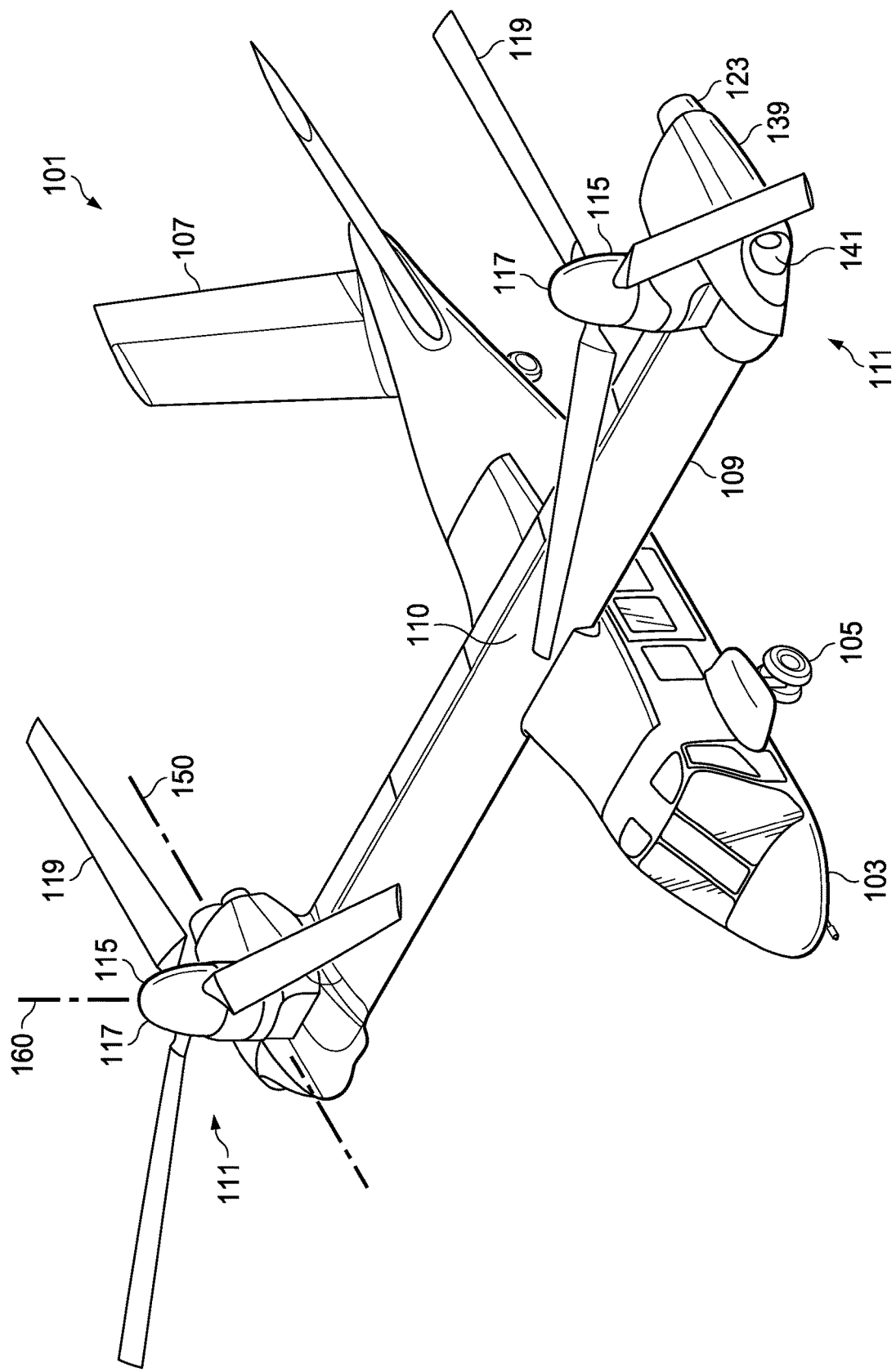
FIG. 1 is a perspective view of a tiltrotor aircraft m helicopter mode, according to the prior art '678 Application.
Figure 2:
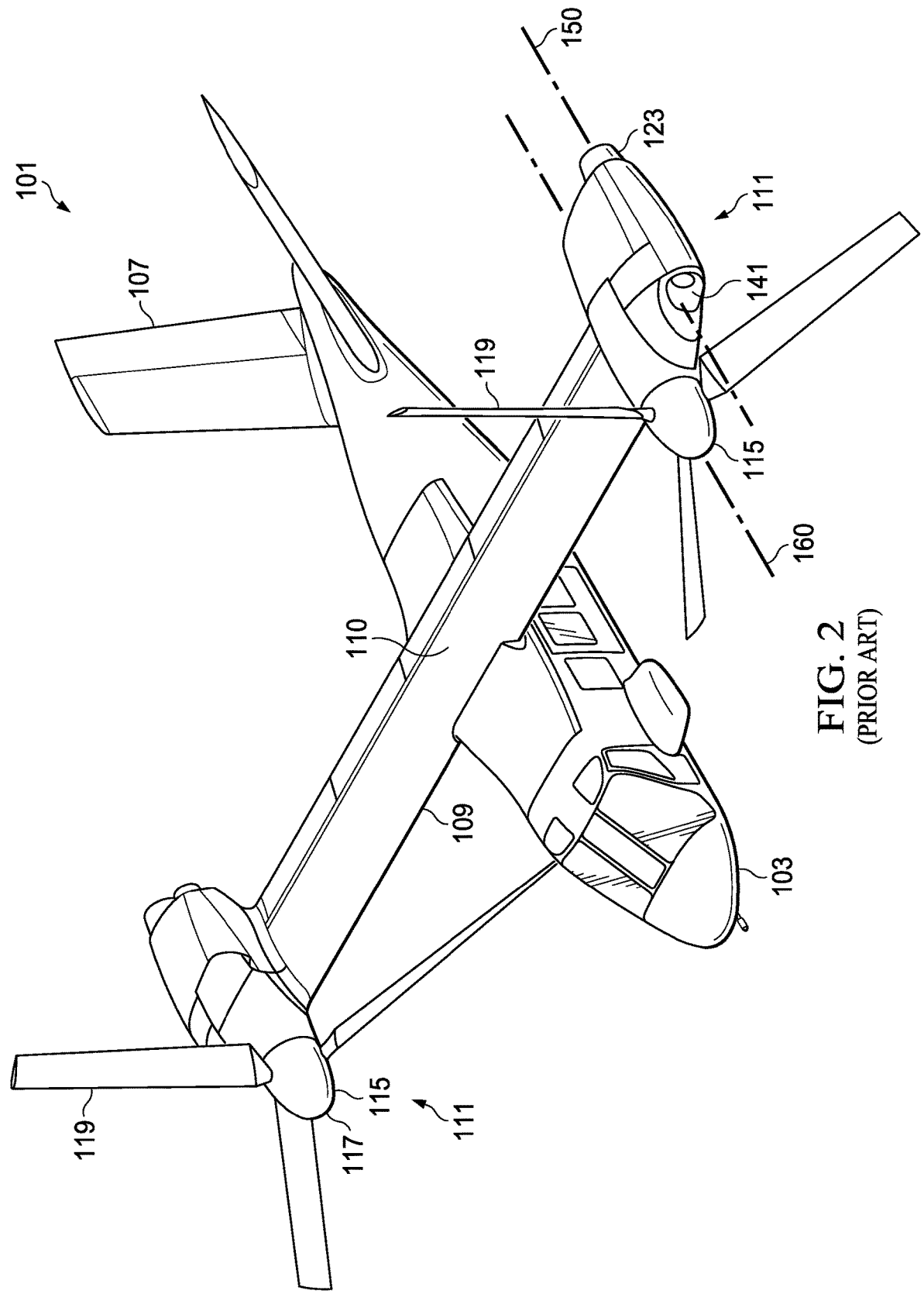
FIG. 2 is a perspective view of a tiltrotor aircraft in airplane mode, according to the prior art '678 Application.
Figure 3C:
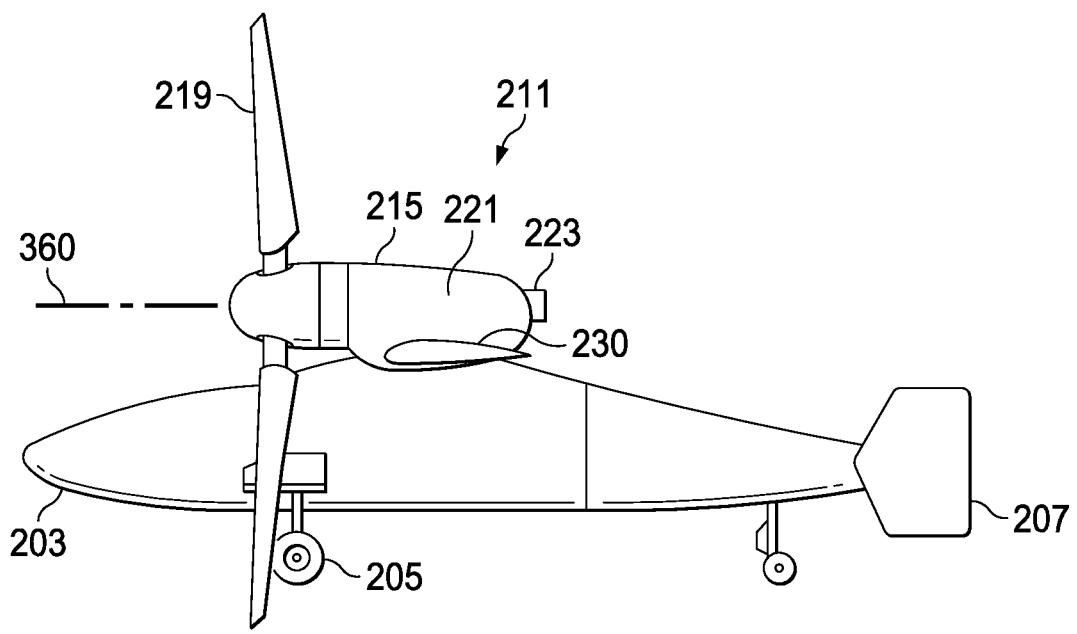
Figure 3D:
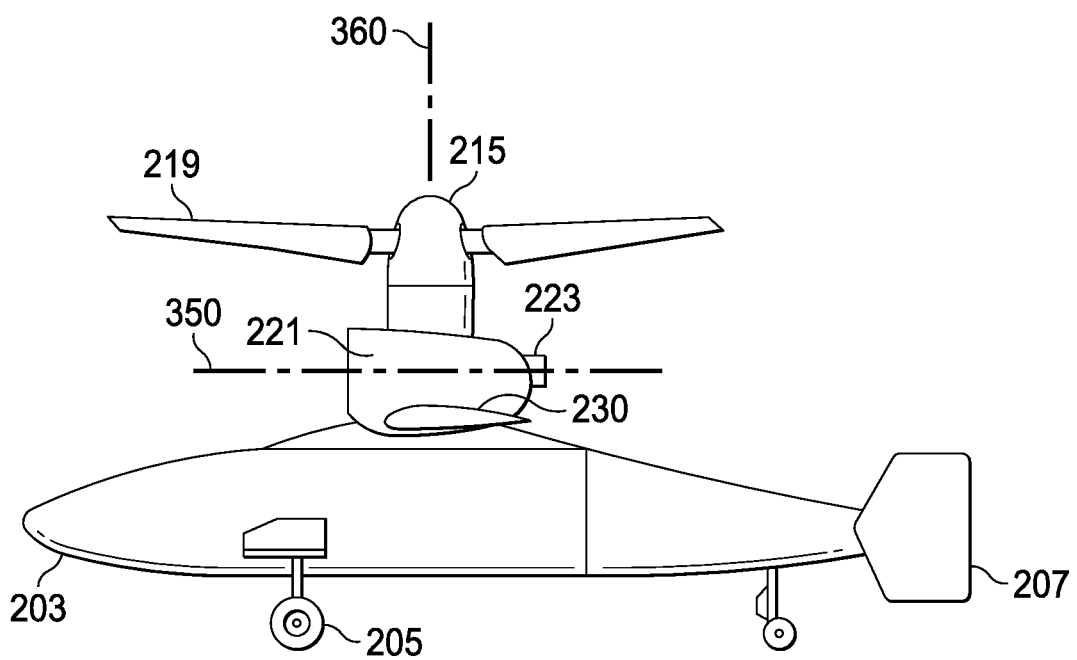

FIGS. 1 and 2 show a tiltrotor aircraft in accordance with a prior art fixed-engine design, but is nevertheless useful in describing the improvements disclosed herein. FIG. 1 shows a tiltrotor aircraft 101 in helicopter configuration, and FIG. 2 shows a similar tiltrotor aircraft 101 in airplane configuration. The tiltrotor aircraft 101 includes a fuselage 103, landing gear 105, a tail section 107 (which may be a "v-tail" as shown in FIGS. 1 and 2, or any other suitable tail section configuration, as is known in the art), one or more wings 109, and propulsion systems 111 and 113 on either end of wing 109. It should be understood that in the prior art, as well as in the present invention, the wing 109 may be a single wing 109 that is affixed atop fuselage 103, or may be comprised of one or more sections 109 on either side of fuselage 103 and a wing connector 110 that connects wings 109 to fuselage 103. Wing 109 includes a leading edge, a trailing edge, a top surface and a bottom surface.

At the outboard edge of wing 109, each propulsion system 111 and 113 include an engine 123 and a proprotor assembly, or proprotor pylon, 115. The proprotor assembly includes rotor blades 119 affixed to a rotor mast 117. As shown in FIGS. 1 and 2, engine 123 includes an inlet 141 and may include an engine cowling 139. The proprotor assembly has a longitudinal axis 160, and is rotatable from 0° to 90° or more, where 0° is substantially parallel to a longitudinal axis 150 of engine 123 and 90° is substantially parallel to engine axis 150.

In the prior art configuration described above, the engine 123 and proprotor assembly 115 are located with the engine outboard of the proprotor assembly 115. This configuration is problematic because the engine is generally in the same plane as the center axis of the wing 109, thereby reducing the potential surface area of wing 109. Additionally, because the wing 109 terminates in the proprotor assembly 115, the configuration limits the ability to add any wing extensions on the engine nacelle distal from the fuselage because the engine location disrupts the structural integrity of the wing relative to an extension.

FIGS. 3A-3D show various views of a tiltrotor aircraft in accordance with embodiments of the present disclosure. The tiltrotor aircraft 201 includes a fuselage 203, landing gear 205 (not shown), a tail section 207, and a wing or wings 209. Fuselage 203 defines a longitudinal axis 390. Wing 209 defines a central longitudinal axis 380. The embodiment shown includes a propulsion system 211 that includes an engine 223 mounted above the top surface of wing 209 and a proprotor assembly 215 mounted above the lop surface of wing 209. It will be understood that while only one propulsion system 211 is described in detail, in various embodiments, the tiltrotor aircraft 201 would include corresponding propulsion systems 211 on either side of the aircraft. Engine 223 defines a longitudinal axis 350, and proprotor assembly 215 defines a longitudinal axis 360. In various embodiments, the tiltrotor assembly 215 is rotatable from a position of 0° to at least 90°, where 0° is measured by the respective longitudinal axes 350 and 360 of the engine 223 and proprotor assembly 215 being substantially parallel, and 90° is measured by the longitudinal axis 360 of the proprotor assembly 215 being substantially perpendicular to the engine axis 350. Proprotor assembly 215 includes a proprotor pylon 221, proprotor mast 217 and rotor blades 219 attached thereto. Additionally, wing extensions 230 may be attached to the structure of wing 209 below the proprotor assembly.

Figure 4:
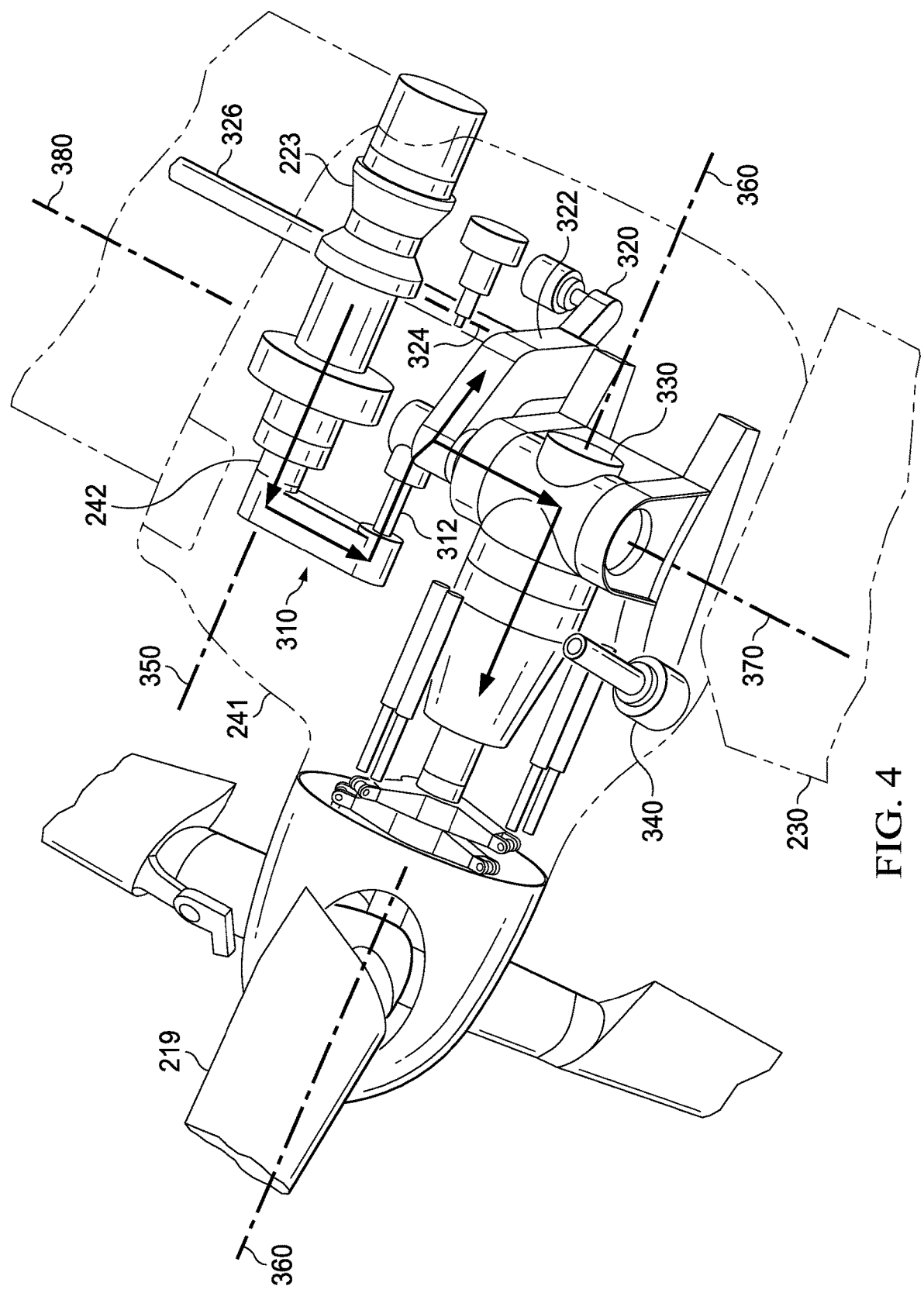
FIG. 4—shows an engine and proprotor configuration in accordance with the present invention.
Figure 5:
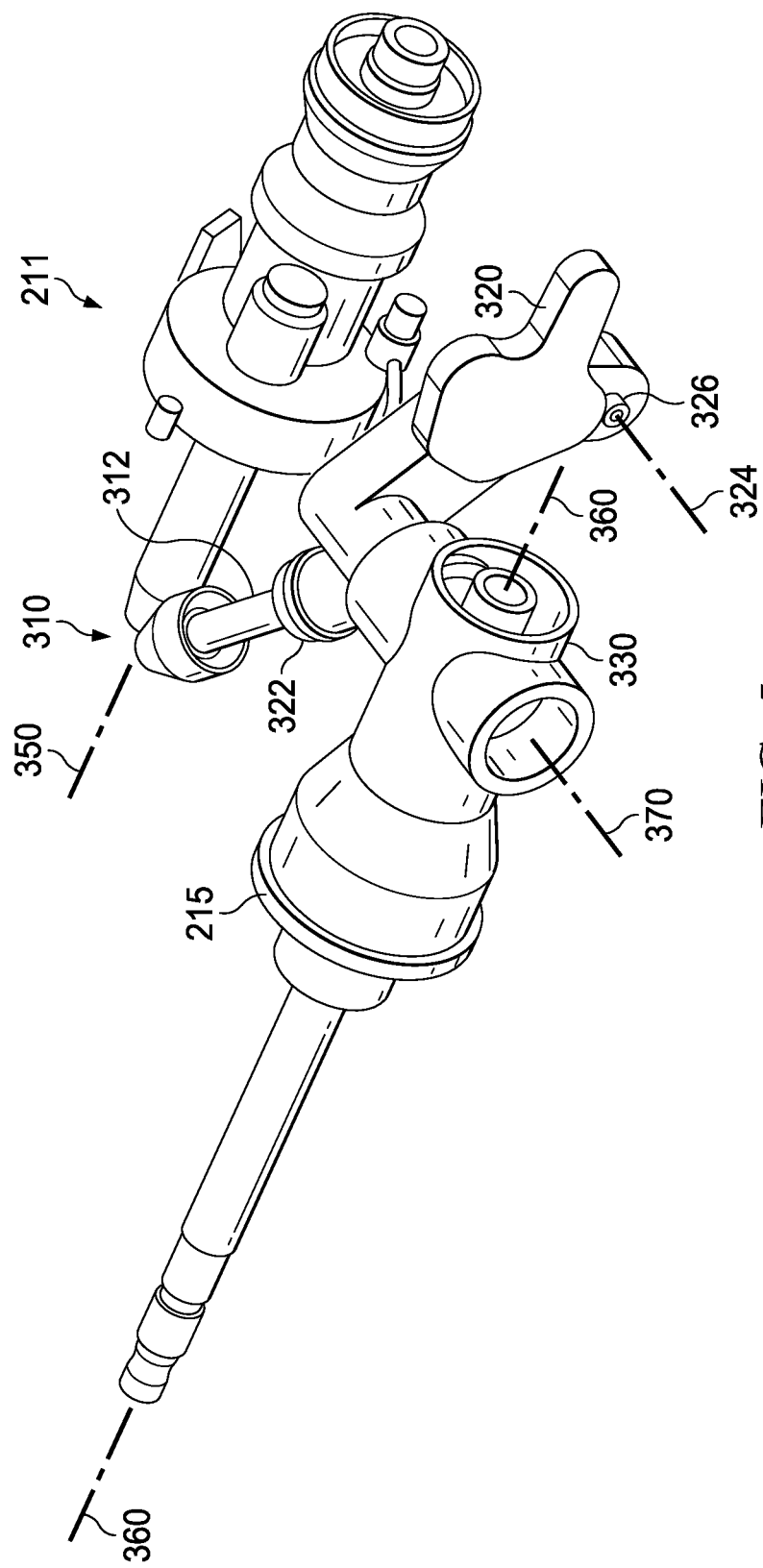
FIG. 5 shows an engine and proprotor configuration without a wing obstructing the view of the various components.

FIGS. 4 and 5 show a detailed view of the propulsion system 211 from a top view and a perspective view, respectively. The propulsion system 211 comprises engine 223 and proprotor assembly 215. Engine 223 may include a nacelle 239, inlet 241, and an output shaft 242. Engine output shaft 242 transfers engine output drive (shown in bold arrows) from engine 223 to one or more gearboxes that terminates at proprotor assembly 215, in the embodiment shown, the engine output shaft 242 connects to an engine reduction gearbox 310, which in turn routes the engine output drive to an interconnect drive system 320 that is more fully described in U.S. patent application Ser. No. 13/966,678. The interconnect drive system 320 may include an interconnect gearbox 322 that further routes the engine output drive to the proprotor gearbox 330, which is part of the proprotor assembly 215, and converts the engine output drive to a rotating engine output along proprotor assembly longitudinal axis 360 to proprotor mast 217. Additionally, the interconnect drive system 320 includes an interconnect drive shaft 326 along an interconnect drive axis 324 that connects the engine output drive from one propulsion assembly 211 to another propulsion assembly 211 on the same aircraft. In a preferred embodiment, the interconnect drive shaft is contained within the body of wing 209 and connects to a corresponding interconnect drive system 320 on another propulsion assembly 211.

The propulsion system 211 also includes a conversion actuator 340 that is operable to rotate the proprotor assembly 214 about conversion axis 370 from 0° to at least 90°.

It should be noted that the various gearboxes serve to route the engine output drive behind the leading edge of wing 209. This routing is preferred but not required. However, by routing the interconnect drive system 320 in the aft section of wing 209, it permits the proprotor gearbox 330 and engine reduction gearbox 310 to be located closer to the leading edge of the wing 209, where there is more structural stability. Additionally, when routing the engine output drive inboard of the proprotor assembly 215 toward leading edge of wing 209, it permits attachment of wing extensions 230 to the wing structure of wing 209.

Figure 6:
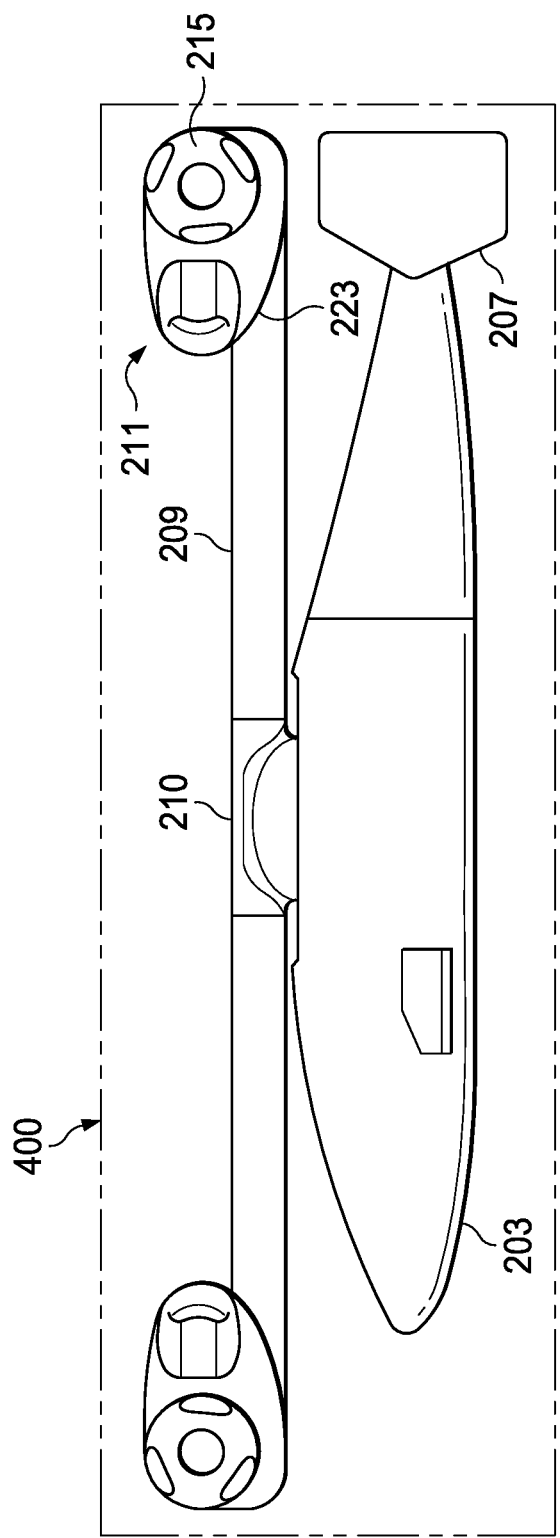
FIG. 6 shows an embodiment of a tiltrotor aircraft in a storage container.

An additional benefit of the propulsion system configuration shown herein is the storability of tiltrotor aircraft 201. Because the engine 223 and tiltrotor assembly 215 allow maximum lift surface of wing 209, the entirety of wing 209 may be removed and/or rotated to a position wherein the central axis of wing 209 is substantially parallel to fuselage longitudinal axis 390. This configuration allows for tiltrotor aircraft 201 to be stored and or shipped in a standard 40' shipping container 400, as shown in FIG. 6. To facilitate the removal and/or rotation of wing 209 relative to fuselage 203, a wing interconnect 210 may be included at the center of wing 209 adjacent to fuselage 203. The wing interconnect allows the wing 209 to be removably attached to the fuselage 203.

The particular embodiments disclosed in this description are intended to be illustrative of, and not limiting to, the novel concepts of the invention as claimed below. Changes, alterations, additions, or omissions may be implemented without departing from the spirit and scope of the invention, including operation of the system using some, more, or less than all of the components shown and described. No limitations are intended to be placed on the disclosure of the invention, except as claimed below. Other claims may be supported by the description herein, and no waiver of such claims is hereby made. It is not the intention of the inventors to invoke the paragraph (f) of 35 U.S.C. § 112 unless the words "means for" and "function" are used explicitly in a particular claim.

What is claimed is:

1. A propulsion system for a tiltrotor aircraft, comprising: an engine disposed on a wing, wherein the engine comprises an output shaft along an engine longitudinal axis, and wherein the wing comprises a leading edge, a trailing edge, a top surface and a bottom surface and a central axis that runs substantially parallel to the leading edge and the trailing edge; a rotatable proprotor assembly disposed on the top surface of the wing, wherein the proprotor assembly comprises a proprotor pylon, a rotor mast, a plurality of rotor blades coupled to the rotor mast, and a proprotor input operable to accept a drive force generated by the output shaft, and wherein the rotor mast and plurality of rotor blades are disposed around a common proprotor longitudinal axis; a first gearbox disposed in a drive path between the output shaft and the proprotor input, wherein the first gearbox is operable to transfer a drive, force from the output shaft to the proprotor input; and a wing extension attached directly to the wing, below the proprotor assembly and engine, wherein the engine longitudinal axis is above, and substantially perpendicular to, the central axis of the wing, wherein the proprotor pylon contains the engine, and wherein a wing interconnect included at a center of the wing allows the wing to be removably attached to a fuselage of the tiltrotor aircraft such that the wing to be removed or rotated to allow the tiltrotor aircraft to be stored or shipped in a shipping container.

2. The propulsion system of claim 1, wherein the proprotor pylon is disposed on the top surface of the wing and connects the proprotor assembly to the wing, and provides for at least a 90° rotation of the proprotor assembly about the central axis of the wing.

3. The propulsion system of claim 1, further comprising a second gearbox, wherein the first gearbox is an engine reduction gearbox, and the second gearbox is proprotor gearbox.

4. The propulsion system of claim 3, further comprising an interconnect drive system, the interconnect drive system comprising:
an interconnect gearbox disposed between the engine reduction gearbox and the proprotor gearbox;
an interconnect drive shaft coupled to the interconnect gearbox, wherein the interconnect drive shaft is operable to transfer drive force from the propulsion system of claim 3 to a second propulsion system disposed on one of the same wing or a second wing, wherein the interconnect drive shaft runs substantially along the longitudinal axis of the wing from the coupling of the interconnect drive shaft at the interconnect gear box, and
wherein the interconnect gearbox is operable to direct at least a portion of the drive force to the interconnect drive shaft.

5. The propulsion system of claim 4, wherein the interconnect gearbox transfers at least a portion of the drive force from the engine reduction gearbox to the proprotor gearbox.

6. The propulsion system of claim 5, wherein:
the engine generates an output drive along the engine axis;
the engine reduction gearbox changes the direction of the output drive at least 90° so that the output drive is routed to the interconnect gearbox;
the interconnect gearbox routes output drive to a proprotor gearbox input; and
the proprotor gearbox converts the output drive to a rotating engine output along a longitudinal axis of the proprotor assembly.

7. The propulsion system of claim 6, wherein the rotating engine output is directed to the rotor mast and rotor blades along the proprotor longitudinal axis.

8. The propulsion system of claim 7, wherein the proprotor longitudinal axis and the engine longitudinal axis are substantially parallel when the tiltrotor aircraft is operating in an airplane mode.

9. The propulsion system of claim 7, wherein the proprotor longitudinal axis and the engine longitudinal axis are substantially normal when the tiltrotor aircraft is operating in a helicopter mode.

10. The propulsion system of claim 7, wherein the engine longitudinal axis is fixed and the proprotor longitudinal axis is rotatable from 0° to at least 90° relative to the engine longitudinal axis.

11. A tiltrotor aircraft, comprising:
a fuselage having a longitudinal axis, a tail section, at least two wings, and at least two propulsion systems, wherein the at least two propulsion systems are disposed opposite each other relative to the fuselage, wherein the at least two wings comprise, respectively, a leading edge, a trailing edge, a top surface, a bottom surface, and a central axis substantially normal to the fuselage; and
wherein the at least two propulsion systems comprise, respectively:
an engine having an engine longitudinal axis, the engine disposed above the central axis of the wing, wherein the engine longitudinal axis is substantially normal to the central axis of the wing;
a proprotor assembly having a proprotor longitudinal axis disposed on a pylon mounted on the top surface of the wing, wherein the proprotor longitudinal axis is substantially normal to the central axis of the wing, and wherein the proprotor longitudinal axis is rotatable in relation to the central axis of the wing from a position substantially parallel to the engine longitudinal axis to a position substantially normal to the engine longitudinal axis, wherein the proprotor assembly comprises a rotor mast and a plurality of rotor blades mounted thereon;
an engine reduction gearbox disposed between an engine output shaft and a proprotor input, the at least one gearbox operable to transfer the drive force generated by the engine to the proprotor assembly to turn the rotor mast;
wing extensions attached directly to the wings below the proprotor assembly and engine; and
a wing interconnect disposed between the two wings,
wherein the wing interconnect is operable to removably attach the wings to the fuselage,
wherein the pylon contains the engine, and
wherein the wing interconnect allows the wings to be removed or rotated to allow the tiltrotor aircraft to be stored or shipped in a shipping container.

12. The tiltrotor aircraft of claim 11, further comprising an interconnect drive system, wherein the interconnect drive system is connected to the engine output shaft, and mounted in a position fixed relative to the engine, and comprises:
an interconnect gearbox disposed between the engine reduction gearbox and the proprotor input; and
an interconnect drive shaft coupled to the interconnect gearbox of each of the at least two propulsion systems along the longitudinal axes of the two wings, wherein the interconnect gearbox is operable to transfer at least a portion of an output drive generated by the engine to the interconnect drive shaft and the proprotor input of each of the at least two propulsion systems.

13. The tiltrotor aircraft of claim 12, further comprising a proprotor gearbox operable to change the direction of the output drive at the proprotor input to the longitudinal axis of the proprotor.

14. The tiltrotor aircraft of claim 11, wherein the at least two wing extensions are operable to removably couple to each of the respective wings.

15. The tiltrotor aircraft of claim 11, wherein the proprotor assembly is positioned distal the fuselage to maximize a turn radius of the rotors disposed on the rotor mast, wherein the engine is positioned directly below the proprotor assembly to maximize the lift area of the wing.

* * * * *